United States Patent
Wus et al.

(10) Patent No.: US 10,073,863 B2
(45) Date of Patent: Sep. 11, 2018

(54) PHOTOGRAPHIC PICTURE QUALITY IMPROVEMENT RECOMMENDATION SYSTEM USING OBJECTS

(71) Applicant: Futurewei Technologies, Inc., Plano, TX (US)

(72) Inventors: John Wus, Yardley, NJ (US); Dong-Qing Zhang, Plainsboro, NJ (US); Zhenyu Wu, Plainsboro, NJ (US); Hongbing Li, Skillman, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 312 days.

(21) Appl. No.: 14/095,222

(22) Filed: Dec. 3, 2013

(65) Prior Publication Data

US 2015/0154230 A1 Jun. 4, 2015

(51) Int. Cl.
*G06F 17/30* (2006.01)

(52) U.S. Cl.
CPC .............................. *G06F 17/30265* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,508,622 B1* | 8/2013 | Anon | ................... | H04N 5/2621 348/222.1 |
| 2008/0285860 A1* | 11/2008 | Datta | ................. | G06K 9/00624 382/224 |
| 2011/0075930 A1* | 3/2011 | Cerosaletti | ......... | G06K 9/00677 382/190 |
| 2012/0076427 A1* | 3/2012 | Hibino | ............... | G06K 9/00671 382/218 |
| 2013/0188866 A1* | 7/2013 | Obrador | ................ | G06T 7/0002 382/165 |
| 2014/0029843 A1* | 1/2014 | Obrador Espinosa | ...................... | G06K 9/00711 382/165 |
| 2015/0178592 A1* | 6/2015 | Ratcliff | .............. | H04N 5/23222 382/155 |

OTHER PUBLICATIONS

Li, C., et al., "Aesthetic Quality Assessment of Consumer Photos with Faces," Proceedings of 2010 IEEE 17th International Conference on Image Processing, Sep. 26-29, 2010, pp. 3221-3224.
Tillmann, K., et al., "Digital Camera Market Overview," CEA, Consumer Electronics Association, Jan. 2012, 23 pages.

\* cited by examiner

*Primary Examiner* — Shyue Jiunn Hwa
(74) *Attorney, Agent, or Firm* — Conley Rose, P.C.

(57) ABSTRACT

A computer program product comprising computer executable instructions stored on a non-transitory computer readable medium such that when executed by a processor, causes the processor to identify an object of interest in a visual media element, analyze the object of interest according to a defined set of rules to form a recommendation for improvement of the visual media element, and recommend the improvement to the visual media element to a user. A method comprising receiving a visual media element as an input, determining a relevant object of interest within the visual media element, analyzing an aesthetic appearance of the relevant object of interest according to a guideline, and recommending a change to the visual media element for conforming to the guideline.

19 Claims, 6 Drawing Sheets

PHOTOGRAPHIC PICTURE QUALITY IMPROVEMENT RECOMMENDATION SYSTEM USING OBJECTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many devices, including smartphones, digital cameras, and camcorders may be used for image and/or video capturing. Among the most highly desired features in a device that is capable of capturing images or video may be high quality capture and professional quality features. Many currently available features may increase the quality of media by adjusting technical details such as exposure, focus, and lighting, but a system that instead increases the quality of captured media based on aesthetic details of objects within the media may be desirable.

SUMMARY

In one embodiment, the disclosure includes a computer program product comprising computer executable instructions stored on a non-transitory computer readable medium such that when executed by a processor, causes the processor to identify an object of interest in a visual media element, analyze the object of interest according to a defined set of rules to form a recommendation for improvement of the visual media element, and recommend the improvement to the visual media element to a user.

In another embodiment, the disclosure includes a method comprising receiving a visual media element as an input, determining a relevant object of interest within the visual media element, analyzing an aesthetic appearance of the relevant object of interest according to a guideline, and recommending a change to the visual media element for conforming to the guideline.

In yet another embodiment, the disclosure includes an apparatus comprising a memory, and a processor coupled to the memory and configured to receive a visual media element, analyze the visual media element according to a set of aesthetic criteria, and output a recommendation for a change to the visual media element based on the aesthetic criteria.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for improving visual media based on aesthetic analysis recommendations. The disclosed techniques may apply to single images, or video frames from a video. With these techniques, visual media may be improved so that it conforms to a set of aesthetic guidelines. The guidelines may be photographic principles such as well-known scene composition rules, user specified settings, or user preferences learned by the system from images the user selects as favorites. Relevant objects that may be used to determine the aesthetic characteristics of the visual media may be determined automatically, by a user, or by a combination of the two. The relevant objects may be analyzed according to the guidelines in order to form a recommendation for improving the aesthetic quality of the visual media. The recommendation may be, for example, visual, audible, or textual. Along with the recommendation, the user may also be provided with an option to improve the visual media without requiring a subsequent visual media element to be captured, or the visual media may be automatically improved according to the recommendation and without requiring additional user input.

Figure 1:
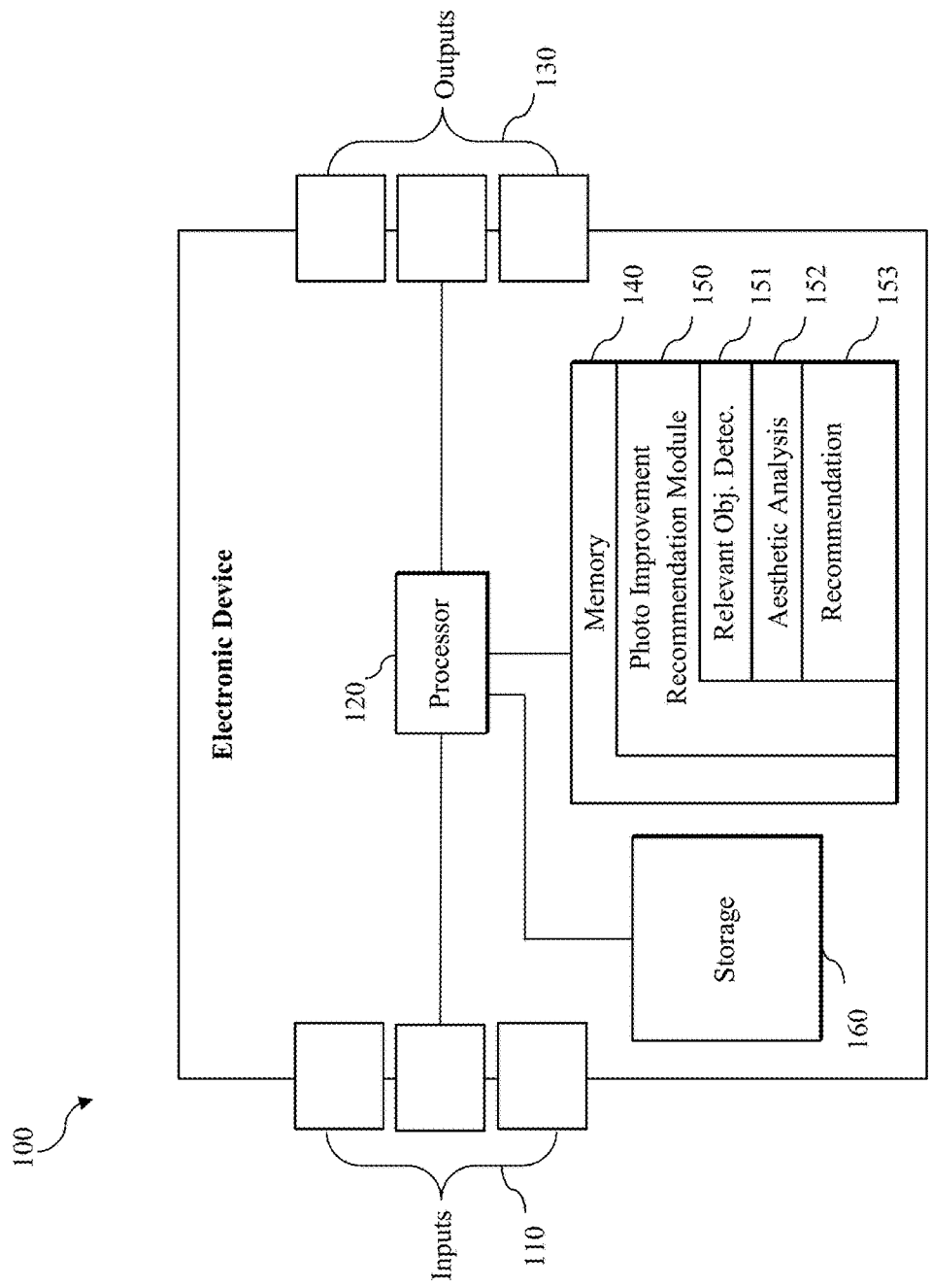
FIG. 1 is a schematic diagram of an embodiment of an electronic device.

FIG. 1 is a schematic diagram of an electronic device 100. The electronic device 100 may be configured to receive input from a user, capture and store still or moving visual media images, and present visual and/or audible feedback to a user. The audible feedback may or may not be synchronized with the visual feedback. Depending on the exact functionality provided, the electronic device 100 may be referred to as a smart phone, a camera phone, a mobile device, a tablet, a camera, a camcorder, a video camera, a point-and-shoot camera, a digital single-lens reflex (DSLR) camera, a computer, or any general electronic device that has the ability to capture and store visual media and to provide visual and/or audible feedback. The electronic device 100 may comprise one or more inputs 110 for receiving data, a processor or logic unit 120 to process data, one or more outputs 130 for transmitting data to other components, memory 140, and storage 160. The electronic device 100 may further comprise components (not shown) such as a receiver, transmitter, or antenna, that may be necessary to communicate over a network, e.g. the Internet, transmit voice and/or data over a network, or perform other additional functions that may be a matter of design choice. The electronic device 100 may be suitable for implementing the features and methods described herein, specifically the photo improvement recommendation system 200.

The processor 120, which may be referred to as a central processing unit (CPU), may be in communication with the inputs 110, outputs 130, memory 140, and storage 160. The processor 120 may be configured to implement instructions stored in the memory 140, receive data from outputs 130, and send data to inputs 110. The processor 120 may be implemented as one or more CPU chips, core (e.g. a multi-core processor), field-programmable gate arrays (FPGAs), application specific integrated circuits (ASICs), and/or digital signal processors (DSPs), and/or may be part of one or more ASICs.

The memory 140 may be comprised of one or more disks, tape drives, or solid-state drives; may be used for non-volatile storage of data and as an over-flow data storage device; may be used to store programs when such programs are selected for execution, e.g. on processor 120; and may be used to store instructions and perhaps data that are read during program execution. The memory 140 may be volatile and/or non-volatile and may be read only memory (ROM), random access memory (RAM), or any combination thereof.

A photo improvement recommendation module 150 may be implemented in the processor 120 and/or the memory 140. As such, the processor 120 and/or the memory 140 may comprise a photo improvement recommendation module 150, which may implement the photo improvement recommendation system 200 shown in FIG. 2. The photo improvement recommendation module 150 may comprise a relevant object detection sub-module 151 (which may comprise instructions for implementing the relevant object determination of step 220 in FIG. 2), an aesthetic analysis sub-module 152 (which may comprise instructions for implementing the aesthetic analysis of step 230 in FIG. 2), and a recommendation sub-module 153 (which may comprise instructions for implementing the recommendation of step 240 in FIG. 2). The relevant object determination sub-module 151 may comprise one or more object determination modes, such as object determination modes 300.

The storage 160 may be a part of the memory 140, internally separate from memory 140, removable, or any combination thereof. The storage 160 may be comprised of one or more solid-state drives, disk drives, and/or combinations thereof that may be used for non-volatile storage of data. Storage 160 may be implemented as ROM, RAM, or any combination thereof. In an alternative embodiment, external storage may be connected to the electronic device 100 an used in place of, or in conjunction with, storage 160.

The inputs 110 may comprise a camera, a lens, a complimentary metal-oxide-semiconductor (CMOS) visual sensor, a charged-coupled device (CCD) visual sensor, a combination of visual sensors, a device otherwise suitable for capturing single image or video frames. The inputs 110 may further comprise a receiver coupled to an antenna, a microphone, a connection port, a user input device, e.g. a touch pad screen, button, rotary dial, etc., or any combination thereof. Generally, the inputs 110 may be any component that has the function of providing data and/or commands to the processor 130 for processing.

The outputs 130 may comprise a transmitter coupled to an antenna, a display, a speaker, a connection port, indicator lights, or any combination thereof. A display used as an output 130 may comprise a light-emitting diode (LED) display, a Color Super Twisted Nematic (CSTN) display, a thin film transistor (TFT) display, a thin film diode (TFD) display, an organic LED (OLED) display, an active-matrix OLED display, or any other display screen. A display used as an output 130 may display in color or monochrome and may be equipped with a touch sensor based on resistive and/or capacitive technologies, in which case the display may also comprise an input 110.

Figure 2:
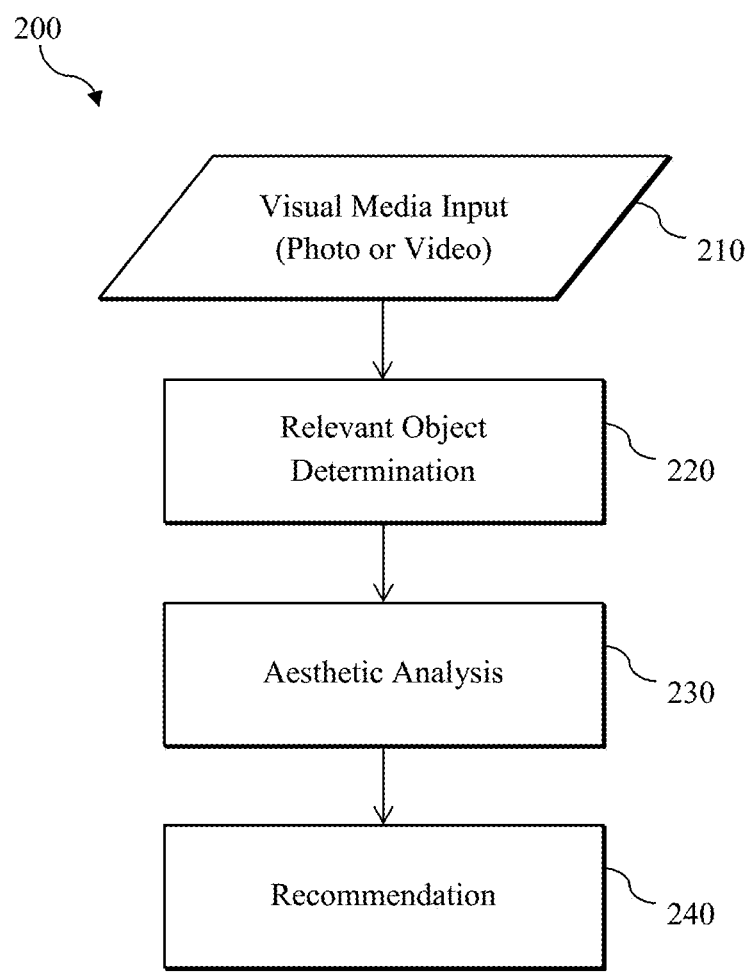
FIG. 2 is a flowchart illustrating an embodiment of a photo improvement recommendation system.

FIG. 2 is a flowchart illustrating a photo improvement recommendation system 200. The photo improvement recommendation system 200 may comprise receiving a visual media input 210, a relevant object determination in step 220, an aesthetic analysis in step 230, and a recommendation in step 240. The visual media input 210 may be a single image or a video frame from a video. Images and video frames are well known in the art, and each image or video frame may comprise a plurality of pixels in a red-green-blue (RGB) or other suitable color space.

At step 220, relevant objects located within the visual media input 210 that may be used for an aesthetic analysis may be determined and separated from the remainder of the visual media input 210. One or more modes of determining relevant objects in step 220 may exist, and are described more fully below. Relevant objects may be determined by examining particular pieces of information about objects located within the visual media input 210. The criteria that may be examined for determining the relevant objects may comprise an object's angle, orientation, location, and/or size. Step 220 may be performed by any suitable object identification technology. For example, in one embodiment of the relevant object determination of step 220, facial detection technology may be employed to determine relevant objects of interest.

Facial areas may commonly be signified as regions-of-interests (ROIs) within visual media elements. Currently, facial detection techniques may employ vision processing, such as machine learning for face classification, in order to process a visual media element and accurately locate a face within the element. Numerous acceptable facial detection techniques may exist, examples of which include principal component analysis, linear discriminate analysis, elastic bunch graph matching, hidden Markov model, multilinear subspace learning, dynamic link matching, and skin texture analysis. In an embodiment of the relevant object determination of step 220 in which facial detection is employed as the method of determining objects of interest, once the face or faces within the image or video frame are located, they are transmitted to step 230 for aesthetic analysis processing.

In another embodiment of the relevant object determination of step 220, object segmentation and recognition may be employed to determine relevant objects of interest in the visual media input 210. Object segmentation of an image or video frame may be done to separate a foreground object from a background object, and may employ techniques well known in the art. For example, color patterns in an image may be employed to segment foreground and background objects. If, in an exemplary image of a person standing in front of a sofa, the sofa has red and white stripes, the sofa may be segmented from the remainder of the image by distinguishing and segmenting the group of red and white colors from the remainder of the image. In an embodiment of the relevant object determination of step 220 in which object segmentation and recognition is employed as the method of determining objects of interest, once the sofa in the background is segmented from the remainder of the image, the foreground and background information may be transmitted to step 230 for aesthetic analysis processing. Further, the importance of each object identified in step 220 may be determined in the aesthetic analysis of step 230 based on information from the object segmentation and recognition performed in step 220.

At step 230, relevant objects determined in step 220 may be analyzed according to one or more aesthetic analysis guidelines to develop a recommendation for a user. Step 230 may analyze objects determined in step 220 to improve the photographic quality and/or visual appearance of a visual media input 210. The aesthetic analysis guidelines utilized in step 230 may comprise photographic principles, user input preferences, or combinations thereof. In an embodiment of the aesthetic analysis of step 230, an optimization function may be implemented that combines joint rate, distortion, and an aesthetic appeal score. The optimization function may be generated via an automatic means, through user input, or a combination thereof.

Photographic principles utilized in the aesthetic analysis performed in step 230 may comprise the scene composition rule, a rule pertaining to the arrangement of objects within a visual media element. The photographic principles may further comprise commonly used composition rules comprising the rule-of-thirds, object centering, and the golden ratio, all of which are well known to one of ordinary skill in the art. A user may also create custom, personalized guidelines that may be incorporated into the aesthetic analysis performed in step 230. Additional guidelines may be created and incorporated into the aesthetic analysis performed in step 230 according to a custom recommendation learning method 400, as discussed below.

At step 240, a recommendation may be presented to the user that may provide guidance for improving the aesthetic quality of the visual media element. In an embodiment of step 240, the recommendation may comprise a visual indicator, e.g. an arrow, textual instructions, or audible instructions suggesting changes that should be made when capturing subsequent versions of the visual media element. In another embodiment of step 240, the recommendation may comprise a visual indicator, e.g. an arrow, textual instructions, or audible instructions, along with an option for the photo improvement recommendation system 200 to automatically improve the visual media element without requiring a subsequent visual media element be captured. In yet another embodiment of step 240, the recommendation may automatically be implemented by the photo improvement recommendation system 200 to improve the visual media element without requiring a subsequent visual media element be captured, or additional input from the user.

Figure 3:
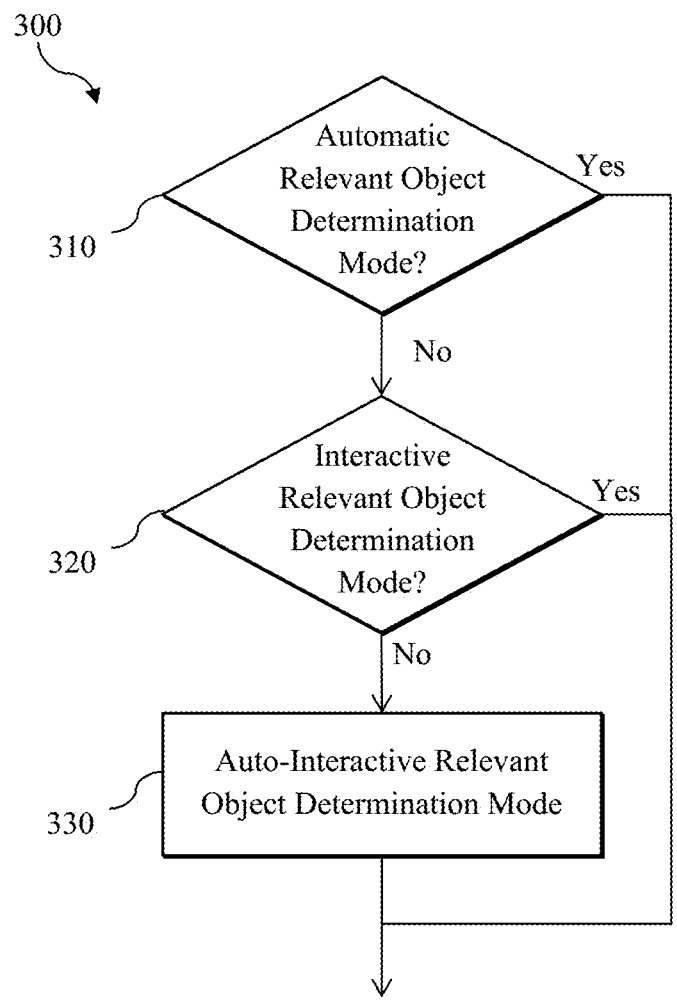
FIG. 3 is a flowchart illustrating an embodiment of object determination modes.

FIG. 3 is a flowchart illustrating object determination modes 300. An embodiment of the photo improvement recommendation system 200 may allow a user to choose between one or more relevant object determination modes 300 in step 220. The relevant object determination modes 300 in step 220 may comprise an automatic mode 310, a user interactive mode 320, or a combined user interactive and automatic mode that may be referred to as auto-interactive mode 330. In an embodiment of automatic mode 310, the photo improvement recommendation system 200 may automatically determine the relevant objects according to the criteria set forth in step 220, and forward those relevant objects to step 230 without requiring additional user interaction. In an embodiment of interactive mode 320, a user may select the relevant objects that may be forwarded to step 230. In another embodiment of interactive mode 320, a user may rank multiple relevant objects in an order of preference before forwarding the ranked relevant objects to step 230. In an embodiment of auto-interactive mode 330, a user may select the relevant objects that may be forwarded to step 230 and the photo improvement recommendation system 200 may rank the user selected relevant objects in an order of preference before forwarding the ranked relevant objects to step 230. In another embodiment of auto-interactive mode 330, the photo improvement recommendation system 200 may automatically determine the relevant objects that may be forwarded to step 230, and a user may rank the relevant objects in an order of preference before forwarding the ranked relevant objects to step 230.

Figure 4:
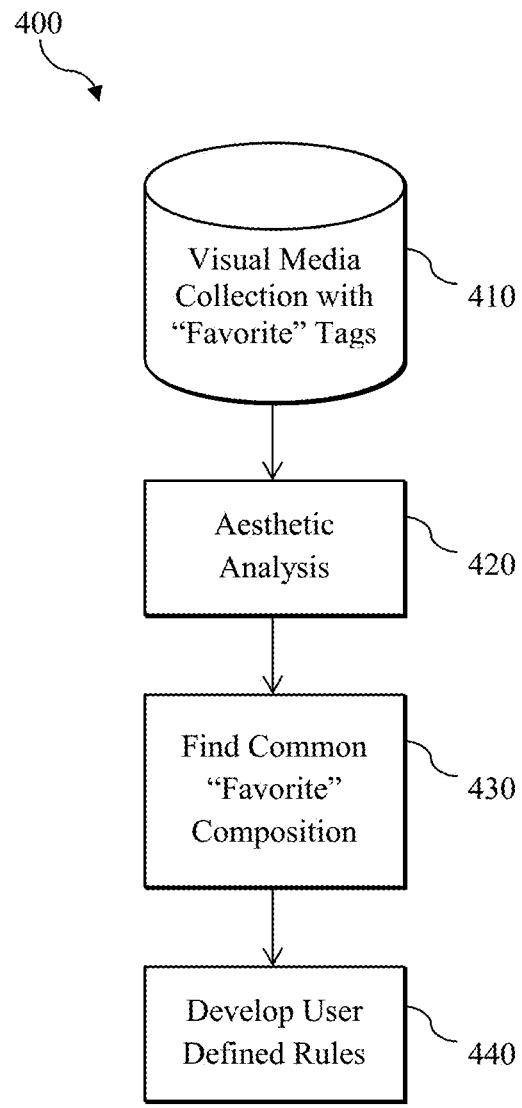
FIG. 4 is a flowchart illustrating an embodiment of a customized recommendation learning method.

FIG. 4 is a flowchart illustrating a customized recommendation learning method 400. The learning method 400 may allow a user to create a custom set of rules or guidelines for use in the aesthetic analysis of step 230. A user may mark or tag a visual media element as having a "favorite" scene composition, at which time the element may be added to a collection 410 comprising an aggregate of "favorite" scene compositions. The collection 410 may be processed in an aesthetic analysis step 420, which may be substantially similar to the aesthetic analysis of step 230. The results of aesthetic analysis step 420 may then be compared in step 430 to determine what aesthetic qualities comprise a "favorite" scene composition. In step 440, the results of the comparison in step 430 may be utilized to develop user-defined rules or guidelines defining a user's "favorite" scene composition. The user-defined rules may be incorporated in the photo improvement recommendation system 200, along with any predefined scene composition rules, for use in subsequent aesthetic analysis in step 230.

Figure 5:
FIG. 5 is an example of a photo improvement recommendation according to an embodiment of this disclosure.

FIG. 5 is an example of a photo improvement recommendation 500 according to an embodiment of this disclosure. In recommendation 500, facial detection is utilized as the method of relevant object determination in step 220, and the photographic principle applied in the aesthetic analysis of step 230 is the composition rule of object centering. As shown in FIG. 5, a visual indicator is used as the method of recommendation, leading from the location of the detected object, i.e. the face, to the location where the object should be located for adherence to the object centering composition rule, and overall improvement of the aesthetics of the photograph.

Figure 6:
FIG. 6 is another example of a photo improvement recommendation according to an embodiment of this disclosure.

FIG. 6 is another example of a photo improvement recommendation 600 according to an embodiment of this disclosure. In recommendation 600, facial detection is utilized as the method of relevant object determination in step 220, and the photographic principle applied in the aesthetic analysis of step 230 is the composition rule of rule-of-thirds. As shown in FIG. 6, a visual indicator is used as the method of recommendation, leading from the location of the detected object, i.e. the face, to the location where the object should be located for adherence to the rule-of-thirds composition rule, and overall improvement of the aesthetics of the photograph.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer program product comprising computer executable instructions stored on a non-transitory computer readable medium such that when executed by a processor, causes the processor to:
    identify an object of interest in a captured visual media element, wherein identifying the object of interest comprises a combination of automatically and interactively identifying the object of interest for analysis based on a combination of input received from a user and pre-defined settings;
    analyze the object of interest according to a defined set of rules to form a recommendation for improvement of the captured visual media element, wherein the defined set of rules comprises a learning process that examines preferred visual media elements of the user to determine a preferred scene composition;
    recommend the improvement to the captured visual media element to the user by superimposing a visual indicator on the captured visual media element;
    receive a response from the user in response to the improvement to the captured visual media element recommended to the user;
    modify the captured visual media element when the response from the user indicates an acceptance of the improvement to the captured visual media element recommended to the user; and
    update the defined set of rules when the modified captured visual media element is marked by the user as a preferred visual media element.

2. The computer program product of claim 1, wherein identifying the object of interest comprises automatically identifying the object of interest for analysis based on aesthetic criteria comprising an angle between the object of interest and a horizontal plane from a camera, an orientation of the object of interest relative to the camera, a location of the object of interest in a picture, a size of the object of interest in the picture, or combinations thereof.

3. The computer program product of claim 1, wherein identifying the object of interest comprises interactively identifying the object of interest for analysis based on input received from the user.

4. The computer program product of claim 1, wherein identifying the object of interest comprises making an identification by analyzing the captured visual media element to identify facial features that define an area of a face located within the captured visual media element.

5. The computer program product of claim 1, wherein identifying the object of interest comprises making an identification according to object segmentation, object recognition, object ranking, or combinations thereof.

6. The computer program product of claim 1, wherein the defined set of rules for analyzing the object of interest further comprise photographic principles.

7. The computer program product of claim 6, wherein the photographic principles comprise a scene composition rule comprising a rule-of-thirds, object centering, a golden ration, or combinations thereof.

8. The computer program product of claim 1, wherein analyzing the object of interest comprises an optimization function comprising joint rate, distortion, aesthetic appealing score, or combinations thereof.

9. The computer program product of claim 1, wherein an interactive option to improve the captured visual media element is presented to the user along with the recommendation.

10. The computer program product of claim 1, further comprising automatically improving the captured visual media element based on the recommendation.

11. The computer program product of claim 1, wherein updating the defined set of rules comprises analyzing one or more preferred visual media elements of the user to determine preferred aesthetic qualities to be incorporated into the defined set of rules.

12. A method comprising:
    receiving a visual media element as an input, wherein the visual media element has been captured and stored by a camera;
    determining a relevant object of interest within the visual media element, wherein determining the relevant object of interest comprises a combination of automatically and interactively identifying the relevant object of interest for analysis based on a combination of input received from a user and pre-defined settings;

analyzing an aesthetic appearance of the relevant object of interest according to a guideline, wherein the guideline comprises a learning process that examines preferred visual media elements of the user to determine a preferred scene composition;

recommending a change to the visual media element for conforming to the guideline by superimposing a visual indicator on the visual media element received as the input;

receiving from the user, a response to the change to the visual media element recommended;

modifying the visual media element when the response from the user indicates an acceptance of the change to the visual media element recommended to the user; and updating the guideline when the change to the visual media element is marked by the user as a preferred visual media element.

13. The method of claim 12, wherein the guideline further comprises a scene composition rule comprising rule-of-third, object centering, golden ratio, or combinations thereof.

14. The method of claim 12, wherein the visual media element is improved by altering the visual media element in response to input received from a user.

15. The method of claim 12, wherein the recommendation comprises one or more changes to the visual media element such that after making the changes to the visual media element, the visual media element more closely adheres to the guideline than before the changes to the visual media element were made.

16. An apparatus comprising:
a sensor configured to capture a visual media element;
a memory configured to store the visual media element captured by the sensor; and
a processor coupled to the memory and the sensor and configured to:
receive the visual media element;

identify an object of interest in the visual media element, wherein identifying the object of interest comprises a combination of automatically and interactively identifying the object of interest for analysis based on a combination of input received from a user and pre-defined settings;

add the visual media element to an aggregate collection of preferred scene compositions;

aesthetically analyze the aggregate collection to determine which aesthetic qualities are included in the preferred scene compositions;

develop user-defined guidelines defining the user's preferred scene composition based on the aesthetic analysis;

output a recommendation for a change to the visual media element based on the user-defined guidelines, wherein the recommendation comprises a visual indicator superimposed on the visual media element received;

receive an input in response to the recommendation;

execute an instruction based on the input received in response to the recommendation; and update the user-defined guidelines when the change to the visual media element is marked by the user as a preferred visual media element.

17. The apparatus of claim 16, wherein the user-defined guidelines further comprises rule-of-thirds, object centering, golden ratio, or combinations thereof.

18. The apparatus of claim 16, wherein executing the instruction based on the input received in response to the recommendation comprises altering the visual media element according to the recommendation, and wherein altering the visual media element comprises making one or more changes to the visual media element such that the visual media element complies with the user-defined guidelines.

19. The apparatus of claim 16, wherein updating the user-defined guidelines comprises analyzing one or more preferred visual media elements of the user to determine preferred aesthetic qualities to be incorporated into the user-defined guidelines.

* * * * *